(12) United States Patent
Tanisugi et al.

(10) Patent No.: US 10,140,850 B2
(45) Date of Patent: Nov. 27, 2018

(54) MOTOR CONTROL DEVICE AND MOTOR CONTROL METHOD

(71) Applicant: Nidec Corporation, Kyoto (JP)

(72) Inventors: Tomoyuki Tanisugi, Kyoto (JP); Yuji Nakamaru, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/607,770

(22) Filed: May 30, 2017

(65) Prior Publication Data
US 2017/0345288 A1 Nov. 30, 2017

(30) Foreign Application Priority Data

May 31, 2016 (JP) .................. 2016-109204

(51) Int. Cl.
*G08C 15/10* (2006.01)
*G05F 1/575* (2006.01)

(52) U.S. Cl.
CPC ............. *G08C 15/10* (2013.01); *G05F 1/575* (2013.01)

(58) Field of Classification Search
CPC ................................ G08C 15/10; G05F 1/575
USPC .......................................................... 318/139
See application file for complete search history.

(56) References Cited

U.S. PATENT DOCUMENTS

| | | | | |
|---|---|---|---|---|
| 4,722,042 A | * | 1/1988 | Asano | H02M 7/53873 318/802 |
| 7,092,623 B2 | * | 8/2006 | Bekker | G01P 3/48 318/400.12 |
| 8,667,783 B2 | | 3/2014 | Naydenov et al. | |
| 8,712,597 B2 | * | 4/2014 | Rozzi | H05K 7/20209 318/473 |
| 2002/0140395 A1 | * | 10/2002 | Tazawa | H02P 6/182 318/727 |
| 2006/0091837 A1 | * | 5/2006 | Xiong | H02P 1/18 318/400.12 |
| 2008/0226350 A1 | * | 9/2008 | Goto | G03G 15/0907 399/240 |
| 2010/0270095 A1 | * | 10/2010 | Shono | B60K 6/365 180/65.29 |
| 2012/0007529 A1 | * | 1/2012 | Kim | H02P 6/08 318/400.04 |
| 2013/0033213 A1 | * | 2/2013 | Wang | F04D 25/166 318/472 |

(Continued)

FOREIGN PATENT DOCUMENTS

| | | |
|---|---|---|
| JP | 2000-316289 A | 11/2000 |
| JP | 2001-342989 A | 12/2001 |
| JP | 2015-211555 A | 11/2015 |

*Primary Examiner* — Kawing Chan
(74) *Attorney, Agent, or Firm* — Keating & Bennett, LLP

(57) ABSTRACT

One exemplary embodiment of the present invention is a motor control device configured to control rotation of a motor based on a drive signal input from an input terminal wherein the motor control device extracts two or more pieces of information of first drive information indicating a drive state or a drive stop state of the motor, second drive information indicating a rotation direction of the motor, third drive information indicating whether the motor is in a forced stop state, and fourth drive information indicating a rotational speed of the motor from at least one of a duty ratio, a voltage, and a frequency in the single drive signal, and controls the motor.

12 Claims, 14 Drawing Sheets

TABLE Tb3

| DUTY RATIO | FIRST DRIVE INFORMATION D1 | SECOND DRIVE INFORMATION D2 | THIRD DRIVE INFORMATION D3 |
|---|---|---|---|
| FIRST RANGE H1 LESS THAN 24% | Lo: DRIVE STATE | Lo: CCW | Hi: FORCED STOP OFF |
| BOUNDARY RANGE H6 24% OR MORE AND LESS THAN 26% | | | |
| SECOND RANGE H2 26% OR MORE AND LESS THAN 49% | Hi: DRIVE STOP STATE | Lo: CCW (INDETERMINATE) | Hi: FORCED STOP OFF |
| BOUNDARY RANGE H6 49% OR MORE AND LESS THAN 51% | | | |
| THIRD RANGE H3 51% OR MORE AND LESS THAN 74% | Lo: DRIVE STATE | Hi: CW | Hi: FORCED STOP OFF |
| BOUNDARY RANGE H6 74% OR MORE AND LESS THAN 76% | | | |
| FOURTH RANGE H4 76% OR MORE | Hi: DRIVE STOP STATE | Hi: CW (INDETERMINATE) | Lo: FORCED STOP ON |

(56) References Cited

U.S. PATENT DOCUMENTS

| | | | | |
|---|---|---|---|---|
| 2014/0062372 A1* | 3/2014 | Hsu | ................ | F04D 27/004 |
| | | | | 318/471 |
| 2014/0159627 A1* | 6/2014 | Lee | ................ | H02P 29/027 |
| | | | | 318/400.22 |
| 2014/0232063 A1* | 8/2014 | Takahashi | ................ | A63F 11/00 |
| | | | | 273/148 R |
| 2014/0232364 A1* | 8/2014 | Thomas | ................ | H02M 7/483 |
| | | | | 323/271 |
| 2014/0361723 A1* | 12/2014 | Matsushita | ................ | H02P 7/2913 |
| | | | | 318/560 |
| 2014/0368677 A1* | 12/2014 | Kobuna | ................ | G03B 13/34 |
| | | | | 348/208.11 |

\* cited by examiner

TABLE Tb1

| DUTY RATIO | FIRST DRIVE INFORMATION D1 | SECOND DRIVE INFORMATION D2 | THIRD DRIVE INFORMATION D3 |
|---|---|---|---|
| FIRST RANGE H1 LESS THAN 25% | Lo: DRIVE STATE | Lo:CCW | Hi: FORCED STOP OFF |
| SECOND RANGE H2 25% OR MORE AND LESS THAN 50% | Hi: DRIVE STOP STATE | Lo:CCW (INDETERMINATE) | Hi: FORCED STOP OFF |
| THIRD RANGE H3 50% OR MORE AND LESS THAN 75% | Lo: DRIVE STATE | Hi:CW | Hi: FORCED STOP OFF |
| FOURTH RANGE H4 75% OR MORE | Hi: DRIVE STOP STATE | Hi:CW (INDETERMINATE) | Lo: FORCED STOP ON |

Fig. 4

TABLE Tb2

| DUTY RATIO | FIRST DRIVE INFORMATION D1 | SECOND DRIVE INFORMATION D2 | THIRD DRIVE INFORMATION D3 |
|---|---|---|---|
| FIFTH RANGE H5 LESS THAN 20% | Hi: DRIVE STOP STATE | Hi:CW (INDETERMINATE) | Lo: FORCED STOP ON |
| FIRST RANGE H1 20% OR MORE AND LESS THAN 40% | Lo: DRIVE STATE | Lo:CCW | Hi: FORCED STOP OFF |
| SECOND RANGE H2 40% OR MORE AND LESS THAN 60% | Hi: DRIVE STOP STATE | Lo:CCW (INDETERMINATE) | Hi: FORCED STOP OFF |
| THIRD RANGE H3 60% OR MORE AND LESS THAN 80% | Lo: DRIVE STATE | Hi:CW | Hi: FORCED STOP OFF |
| FOURTH RANGE H4 80% OR MORE | Hi: DRIVE STOP STATE | Hi:CW (INDETERMINATE) | Lo: FORCED STOP ON |

Fig. 6

TABLE Tb3

| DUTY RATIO | FIRST DRIVE INFORMATION D1 | SECOND DRIVE INFORMATION D2 | THIRD DRIVE INFORMATION D3 |
|---|---|---|---|
| FIRST RANGE H1 LESS THAN 24% | Lo: DRIVE STATE | Lo: CCW | Hi: FORCED STOP OFF |
| BOUNDARY RANGE H6 24% OR MORE AND LESS THAN 26% | | | |
| SECOND RANGE H2 26% OR MORE AND LESS THAN 49% | Hi: DRIVE STOP STATE | Lo: CCW (INDETERMINATE) | Hi: FORCED STOP OFF |
| BOUNDARY RANGE H6 49% OR MORE AND LESS THAN 51% | | | |
| THIRD RANGE H3 51% OR MORE AND LESS THAN 74% | Lo: DRIVE STATE | Hi: CW | Hi: FORCED STOP OFF |
| BOUNDARY RANGE H6 74% OR MORE AND LESS THAN 76% | | | |
| FOURTH RANGE H4 76% OR MORE | Hi: DRIVE STOP STATE | Hi: CW (INDETERMINATE) | Lo: FORCED STOP ON |

Fig. 7

TABLE Tb4

| DUTY RATIO | FIRST DRIVE INFORMATION D1 | SECOND DRIVE INFORMATION D2 | THIRD DRIVE INFORMATION D3 | FOURTH DRIVE INFORMATION D4 |
|---|---|---|---|---|
| FIRST RANGE H1 LESS THAN 25% | Lo: DRIVE STATE | Lo:CCW | Hi: FORCED STOP OFF | R1~R25 |
| SECOND RANGE H2 25% OR MORE AND LESS THAN 50% | Hi: DRIVE STOP STATE | Lo:CCW (INDETERMINATE) | Hi: FORCED STOP OFF | |
| THIRD RANGE H3 50% OR MORE AND LESS THAN 75% | Lo: DRIVE STATE | Hi:CW | Hi: FORCED STOP OFF | R1~R25 |
| FOURTH RANGE H4 75% OR MORE | Hi: DRIVE STOP STATE | Hi:CW (INDETERMINATE) | Lo: FORCED STOP ON | |

Fig. 9

TABLE Tb5

| VOLTAGE | FIRST DRIVE INFORMATION D1 | SECOND DRIVE INFORMATION D2 | THIRD DRIVE INFORMATION D3 | FOURTH DRIVE INFORMATION D4 |
|---|---|---|---|---|
| FIRST RANGE I1 VR1 OR HIGHER AND LOWER THAN VR2 | Lo: DRIVE STATE | Lo:CCW | Hi: FORCED STOP OFF | R1~R25 |
| SECOND RANGE I2 VR2 OR HIGHER AND LOWER THAN VR3 | Hi: DRIVE STOP STATE | Lo:CCW (INDETERMINATE) | Hi: FORCED STOP OFF | |
| THIRD RANGE I3 VR3 OR HIGHER AND LOWER THAN VR4 | Lo: DRIVE STATE | Hi:CW | Hi: FORCED STOP OFF | R1~R25 |
| FOURTH RANGE I4 VR4 OR HIGHER AND VR5 OR LOWER | Hi: DRIVE STOP STATE | Hi:CW (INDETERMINATE) | Lo: FORCED STOP ON | |

Fig. 12

TABLE Tb6

| VOLTAGE | FIRST DRIVE INFORMATION D1 | SECOND DRIVE INFORMATION D2 | THIRD DRIVE INFORMATION D3 | FOURTH DRIVE INFORMATION D4 |
|---|---|---|---|---|
| FIRST RANGE J1 FR1 OR HIGHER AND LOWER THAN FR2 | Lo: DRIVE STATE | Lo:CCW | Hi: FORCED STOP OFF | R1~R25 |
| SECOND RANGE J2 FR2 OR HIGHER AND LOWER THAN FR3 | Hi: DRIVE STOP STATE | Lo:CCW (INDETERMINATE) | Hi: FORCED STOP OFF | |
| THIRD RANGE J3 FR3 OR HIGHER AND LOWER THAN FR4 | Lo: DRIVE STATE | Hi:CW | Hi: FORCED STOP OFF | R1~R25 |
| FOURTH RANGE J4 FR4 OR HIGHER AND FR5 OR LOWER | Hi: DRIVE STOP STATE | Hi:CW (INDETERMINATE) | Lo: FORCED STOP ON | |

Fig. 14

MOTOR CONTROL DEVICE AND MOTOR CONTROL METHOD

CROSS REFERENCE TO RELATED APPLICATIONS

This application claims the benefit of priority to Japanese Patent Application No. 2016-109204 filed on May 31, 2016. The entire contents of this application are hereby incorporated herein by reference.

BACKGROUND OF THE INVENTION

1. Field of the Invention

The present invention relates to a motor control device and motor control method for controlling a motor.

2. Description of the Related Art

A DC motor driving device of the related art is described in, for example, Japanese Unexamined Patent Application No. 2000-316289. In Japanese Unexamined Patent Application No. 2000-316289, in the DC motor drive control device, a control state changes according to a state of an acceleration signal and a deceleration signal output from a speed discrimination circuit in an ASIC. Here, the control state includes "acceleration," "neutral," and "deceleration."

In the motor driving device described in Japanese Unexamined Patent Application No. 2000-316289, a signal line through which two signals, an acceleration signal and a deceleration signal, are input from the speed discrimination circuit in the ASIC is necessary. In addition, in the motor driving device described in Japanese Unexamined Patent Application No. 2000-316289, only acceleration, deceleration or neutral, which are states of a rotational speed of a motor, is set using an acceleration signal and a deceleration signal, and more signal lines are necessary in order to determine other states.

SUMMARY OF THE INVENTION

A control device of a motor according to one exemplary embodiment of the present invention extracts two or more pieces of information of first drive information indicating a drive state or a drive stop state of the motor, second drive information indicating a rotation direction of the motor, third drive information indicating whether the motor is in a forced stop state and fourth drive information indicating a rotational speed of the motor from at least one of a duty ratio, a voltage, and a frequency in the single drive signal and controls the motor.

In the motor control device according to one exemplary embodiment of the present invention, it is possible to reduce the number of input terminals.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram showing an example of a table that is stored in a storage unit.

FIG. 6 is a diagram showing another example of the table.

FIG. 7 is a diagram showing another example of the table.

FIG. 9 is a diagram showing an example of a table used in the motor control device shown in FIG. 8.

FIG. 12 is a diagram showing an example of a table used in the motor control device shown in FIG. 11.

FIG. 14 is a diagram showing an example of a table used in the motor control device shown in FIG. 13.

DETAILED DESCRIPTION OF THE PREFERRED EMBODIMENTS

Figure 1:
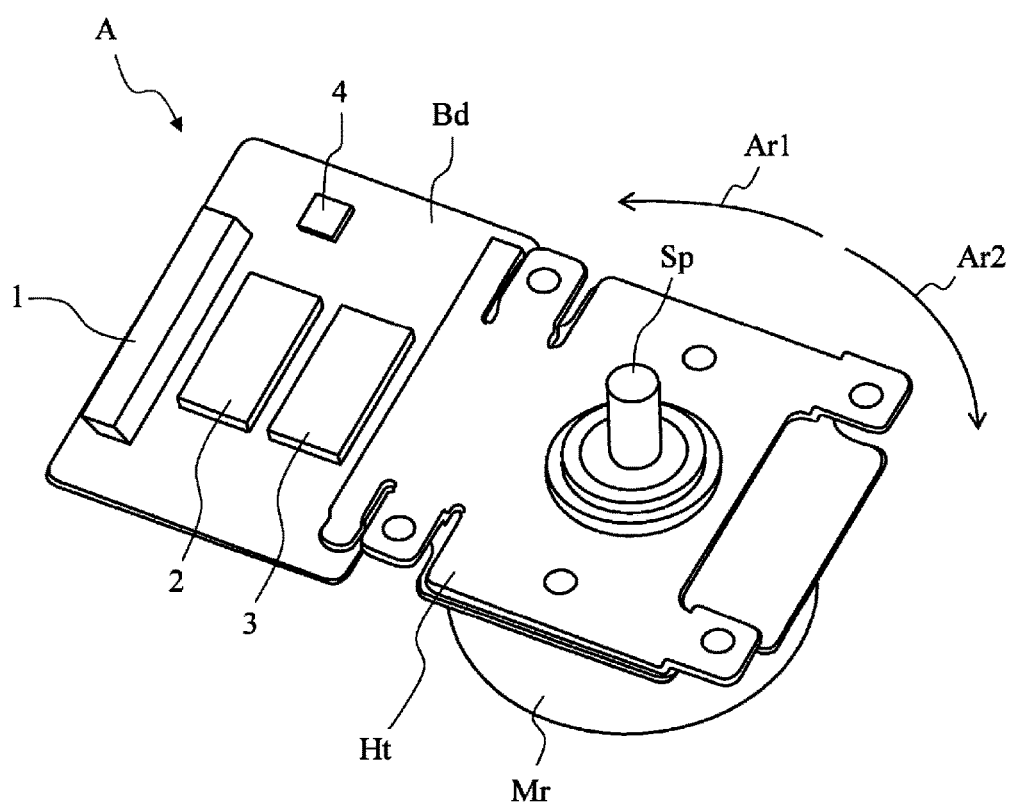
FIG. 1 is a perspective view of a brushless DC motor and a peripheral part thereof.

One exemplary embodiment of the present invention will be described below with reference to the drawings. FIG. 1 is a perspective view of a brushless DC motor and a peripheral part thereof. Here, in the following description, a brushless DC motor Mr will be simply referred to as a motor Mr. In addition, in the following description, as a state of the motor Mr, a drive state or a drive stop state, a rotation direction of the motor Mr, states of forced stop of the motor Mr and a rotational speed of the motor Mr may be used. The states of the motor Mr are as follows. The drive state of the motor Mr indicates a state in which power is supplied to the motor Mr, and a rotation force is generated in an output shaft or a rotation force is generated. In addition, the drive stop state indicates a state in which power supply to the motor Mr is stopped and no rotation force is generated in an output shaft or no rotation force is generated. In addition, the rotation direction of the motor Mr indicates a rotation direction when an output shaft Sp of the motor Mr is viewed from one side of a central axis. In the following description, based on the state in FIG. 1, a counterclockwise direction will be referred to as a CCW direction (an arrow Ar1 in FIG. 1) and a clockwise rotation direction of the output shaft Sp will be referred to as a CW direction (an arrow Ar2 in FIG. 1). Furthermore, the forced stop of the motor Mr indicates a state in which a force in a direction opposite to a rotation direction of the rotating output shaft Sp is applied and rotation is forcibly stopped. Also, while the output shaft Sp is stopped, if the state is a forced stop state, it indicates a state in which the output shaft Sp is not rotated by an external force. The rotational speed is a rotational speed of the output shaft Sp.

A motor control device A according to the present embodiment is a control device configured to control rotation of a brushless DC motor Mr included in an OA instrument such as a printer and a multifunction machine. Here, the motor is not limited to the brushless DC motor, but motors capable of controlling any two or more items of control of a drive state or a drive stop state, control of a rotation direction, control of forced stop and control of a rotational speed can be widely used. As shown in FIG. 1, the motor Mr is mounted on a metal mounting plate Ht and is mounted on a wiring board Bd of the motor control device A together with the mounting plate Ht. The motor Mr includes the output shaft Sp for rotating an object.

Figure 2:
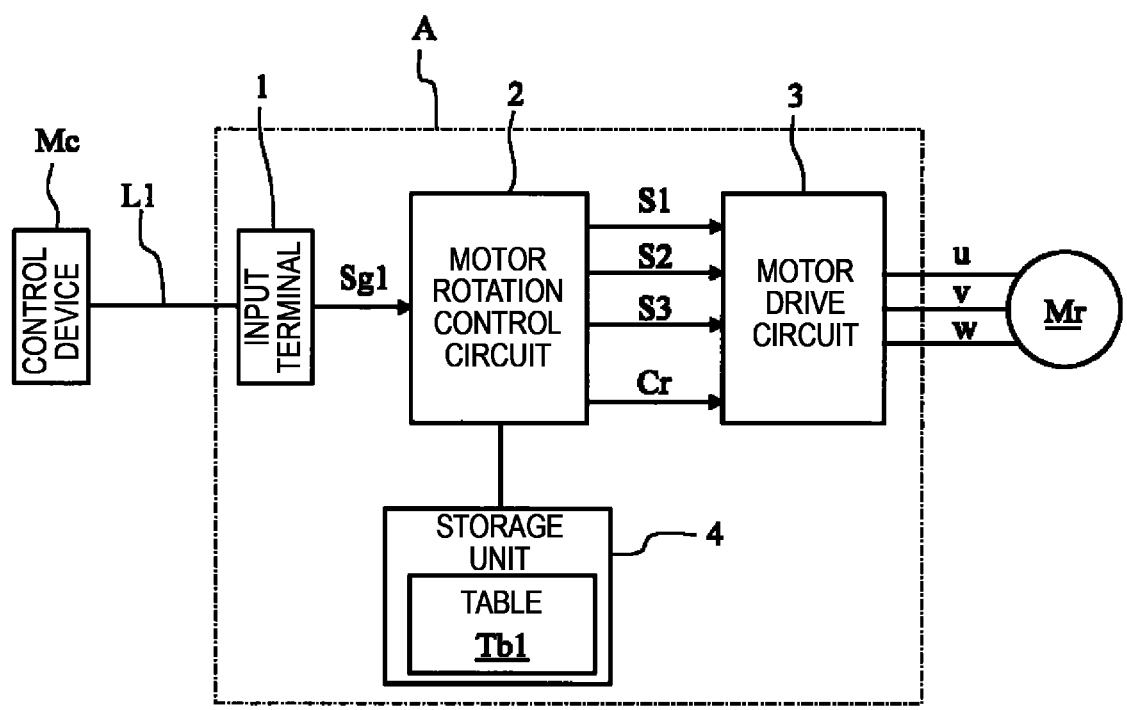
FIG. 2 is a block diagram of an example of a motor control device according to the present invention.

FIG. 2 is a block diagram of an example of a motor control device according to the present invention. As shown in FIG. 1 and FIG. 2, the motor control device A includes an input terminal 1, a motor rotation control circuit 2, a motor drive circuit 3, and a storage unit 4. Here, in the motor control device A according to the present embodiment, the input terminal 1, the motor rotation control circuit 2, the motor drive circuit 3 and the storage unit 4 are mounted on the board Bd. In addition, the motor control device A is connected to a power source (not shown). The motor control device A supplies power supplied from the power source to the motor Mr and thus rotates and drives the motor Mr.

The input terminal 1 is a terminal to which a cable from a control device Mc included in an OA instrument is connected. In the motor control device A of the present embodiment, a control signal line L1 from the control device Mc is connected.

The control signal line L1 is a signal line to which a drive signal Sg1 for controlling a state of a motor such as a drive state or drive stop state, a rotation direction, forced stop and a speed is input. That is, the motor control device A controls rotation of a motor based on the drive signal Sg1 input from the input terminal 1.

The motor rotation control circuit 2 is connected to the input terminal 1. In the motor rotation control circuit 2, the drive signal Sg1 input to the input terminal 1 is input. The motor rotation control circuit 2 extracts a state of the motor Mr from the drive signal Sg1. The motor rotation control circuit 2 is a circuit including a processing circuit such as an MPU and a CPU. The motor rotation control circuit 2 is connected to the storage unit 4. The storage unit 4 includes a semiconductor memory such as a ROM and a RAM. The storage unit 4 stores information, programs and the like necessary for drive control of the motor Mr. In this case, the motor rotation control circuit 2 accesses the storage unit 4 and reads information, programs and the like stored in the storage unit 4.

The motor drive circuit 3 is a circuit configured to adjust power that is supplied to the motor Mr. The motor drive circuit 3 is a circuit that includes, for example, a switching element, and changes a state of the motor Mr by supplying a current or stopping supply of a current to a coil (not shown) included in the motor Mr at a predetermined timing. In the present embodiment, the motor Mr is the brushless DC motor.

The brushless DC motor includes a plurality of coils arranged in a stator. Here, any of a U phase, a V phase and a W phase is assigned to the coils. The motor drive circuit 3 supplies a current to a U-phase coil, a V-phase coil and a W-phase coil at a predetermined timing to set a drive state, a drive stop state, a rotation direction, a forced stop state or the like. In addition, it is possible to change a rotational speed by changing a frequency at which a current is switched. Also, a motor other than the brushless DC motor may be used. In this case, the motor drive circuit 3 supplies power to a motor using a power supply method according to the motor.

Figure 3:
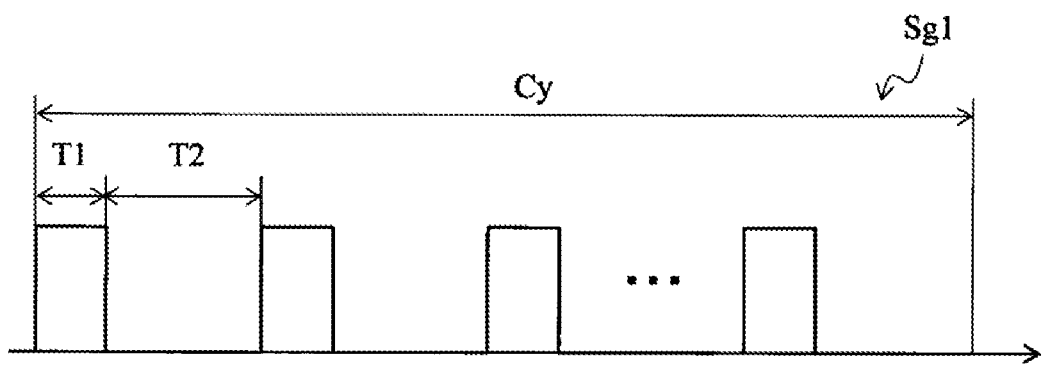
FIG. 3 is a diagram showing a drive signal.

A drive signal will be described with reference to the drawing. FIG. 3 is a diagram showing a drive signal. As shown in FIG. 3, the drive signal Sg1 is a signal in which an ON period T1 and an OFF period T2 are alternately shown. Here, in the drive signal Sg1, a percentage of the ON period T1 in one cycle Cy is a duty ratio Dr. The duty ratio Dr is represented as a percentage. For example, when there is no ON period T1 in one cycle, the duty ratio Dr is "0%" and when half of one cycle is the ON period T1, the duty ratio Dr is "50%." Also, the control device Mc includes a circuit capable of changing the duty ratio Dr of the output drive signal Sg1 from "0%" to "100%." As a signal whose duty ratio Dr can be changed, a PWM signal can be exemplified, but the present invention is not limited thereto.

When the drive signal Sg1 is received from the input terminal 1, the motor rotation control circuit 2 acquires a duty ratio Dr and a frequency Fr of the drive signal Sg1. The motor rotation control circuit 2 calls a table Tb1 stored in the storage unit 4 and compares the duty ratio Dr with the table Tb1. Then, the motor rotation control circuit 2 extracts first drive information D1 indicating a drive state or a drive stop state of the motor Mr, second drive information D2 indicating a rotation direction of the motor and third drive information D3 indicating whether the motor is in a forced stop state from the duty ratio Dr. In addition, fourth drive information D4 indicating a rotational speed of the motor is extracted from the frequency Fr of the drive signal Sg1.

The table Tb1 is stored in the storage unit 4. The table Tb1 associates the duty ratio Dr of the drive signal Sg1 and a state of the motor Mr. FIG. 4 is a diagram showing an example of a table stored in the storage unit.

The first drive information D1, the second drive information D2, and the third drive information D3 are Lo or Hi. In the first drive information D1, Lo indicates a drive state of the motor Mr and Hi indicates a drive stop state of the motor Mr. In the second drive information D2, Lo indicates a CCW direction, and Hi indicates a CW direction. In addition, in the third drive information D3, Lo indicates a forced stop state. In the following description, the forced stop state will be referred to as forced stop ON. In addition, in the third drive information D3, Hi indicates that the state is not a forced stop state. In the following description, a state that is not the forced stop state will be referred to as forced stop OFF.

The table Tb1 is referred to when the first drive information D1, the second drive information D2 and the third drive information D3 are extracted from the duty ratio Dr. The duty ratio Dr of the drive signal Sg1 may have a variation. In consideration of the variation of the duty ratio Dr, in the table Tb1, the first drive information D1, the second drive information D2, and the third drive information D3 are associated with ranges each having a width including values of the duty ratio.

In the table Tb1, the available duty ratio (from 0% to 100%) in the drive signal Sg1 is divided into four ranges. The divided ranges of the duty ratio are set as a first range H1 to a fourth range H4. The motor control device of the present embodiment stores a table in which the duty ratio is divided into a plurality of ranges and the first drive information D1, the second drive information D2, and the third drive information D3 are associated with the ranges. The table is stored in the storage unit 4.

Accordingly, in the table Tb1, the first drive information D1, the second drive information D2, and the third drive information D3 are associated with the first range H1 to the fourth range H4. Also, here, the first range H1 has a duty ratio of less than 25%. The second range H2 has a duty ratio of 25% or more and less than 50%. The third range H3 has a duty ratio of 50% or more and less than 75%. The fourth range H4 has a duty ratio of 75% or more. Also, the range of the duty ratio indicates a duty ratio of a constant width. Also, the number of divisions is not limited to four. For example, the duty ratio may be divided into three or fewer ranges or divided into five or more ranges. In addition, in the table Tb1 of the present embodiment, the widths of the ranges of the duty ratio are equal, that is, the available duty ratio is equally divided, but the present invention is not limited thereto. The width of the duty ratio may differ for each range.

The table Tb1 will be described in detail. In the table Tb1, the first drive information D1, the second drive information D2 and the third drive information D3 are associated with the first range H1 to the fourth range H4.

In the table Tb1, the first drive information D1, the second drive information D2 and the third drive information D3 associated with the first range H1 to the fourth range H4 are as follows. In the first range H1, the first drive information D1 is Lo (drive state), the second drive information D2 is Lo (CCW direction), and the third drive information D3 is Hi (forced stop OFF). In the second range H2, the first drive information D1 is Hi (drive stop state), the second drive information D2 is Lo (CCW direction), and the third drive information D3 is Hi (forced stop OFF). In the third range H3, the first drive information D1 is Lo (drive state), the second drive information D2 is Hi (CW direction), and the third drive information D3 is Hi (forced stop OFF). In the fourth range H4, the first drive information D1 is Hi (drive stop state), the second drive information D2 is Hi (CW direction) and the third drive information D3 is Lo (forced stop ON).

In the table Tb1, the first range H1 to the fourth range H4 indicate a state of the motor Mr. The state of the motor Mr in the first range H1 is forced stop OFF in a drive state in the CCW direction. The state of the motor Mr in the second range H2 is a drive stop state. The state of the motor Mr in the third range H3 is forced stop OFF in a drive state in the CW direction. The state of the motor Mr in the fourth range H4 is a forced stop ON state. As described above, the second range H2 is a drive stop state, and the fourth range H4 is forced stop ON. Therefore, in the second range H2 and the fourth range H4, the second drive information D2 may be Hi or Lo, that is, may be indeterminate.

Also, in the present embodiment, in order to facilitate understanding, the table Tb1 includes the term "drive state" or "drive stop state" as the first drive information D1. In addition, the term "CCW direction" or "CW direction" is included as the second drive information D2. In addition, the term "forced stop ON" or "forced stop OFF" is included as the third drive information D3. However, each piece of information of the table Tb1 stored in the storage unit 4 is actually Hi (1) or Lo (0).

The motor rotation control circuit 2 extracts the duty ratio Dr of the drive signal Sg1, refers to the table Tb1 stored in the storage unit 4, and extracts the first drive information D1, the second drive information D2, and the third drive information D3. Then, the extracted first drive information D1, second drive information D2, and third drive information D3 are transmitted to the motor drive circuit 3 as a first signal S1, a second signal S2 and a third signal S3. The first signal S1, the second signal S2 and the third signal S3 each are a Hi signal or a Lo signal. Accordingly, a plurality of pieces of drive information necessary for driving the motor Mr can be obtained from the single drive signal Sg1.

In addition, the motor rotation control circuit 2 acquires the frequency Fr of the drive signal Sg1. The motor rotation control circuit 2 performs PLL control. The motor rotation control circuit 2 determines a rotational speed of the motor Mr based on the frequency Fr of the drive signal Sg1. That is, in the motor rotation control circuit 2, when the frequency Fr of the drive signal Sg1 is low, a rotational speed of the motor Mr is low, and when the frequency Fr of the drive signal Sg1 is high, a rotational speed of the motor Mr is high. The motor rotation control circuit 2 acquires the fourth drive information D4 that is information about a rotational speed of the motor Mr from the frequency Fr of the drive signal Sg1. Then, a clock signal Cr is generated based on the fourth drive information D4 and transmitted to the motor drive circuit 3.

Also, as shown in FIG. 2, the motor rotation control circuit 2 transmits four signals including the first signal S1, the second signal S2, the third signal S3, and the clock signal Cr to the motor drive circuit 3 independently.

The motor drive circuit 3 acquires information about a drive state or a drive stop state of the motor Mr, a rotation direction, and forced stop ON or OFF from the first signal S1, the second signal S2 and the third signal S3. In addition, the motor drive circuit 3 adjusts a rotational speed of the motor Mr based on the clock signal Cr.

A motor control device A has the above-described configuration. Next, the operation of the motor control device A will be described.

Figure 5:
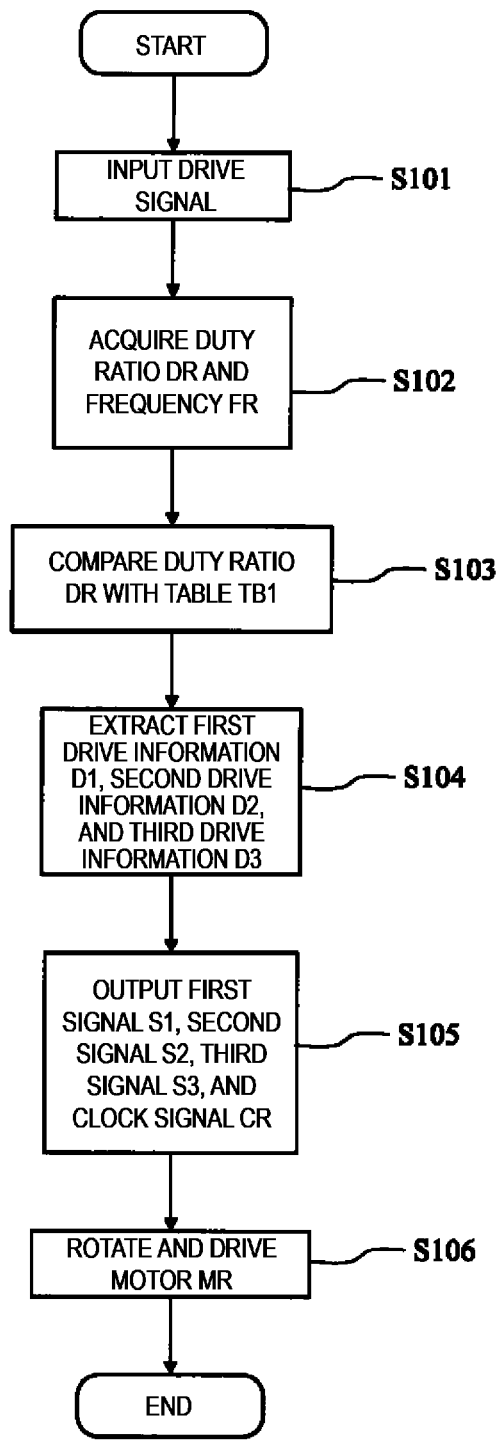
FIG. 5 is a flowchart describing operations of a motor control device according to the present embodiment.

FIG. 5 is a flowchart describing operations of a motor control device according to the present embodiment. When the drive signal Sg1 is input from the control device Mc through the input terminal 1 (Step S101), the motor rotation control circuit 2 acquires a duty ratio Dr and a frequency Fr of a drive signal Sg1 (Step S102).

Then, the motor rotation control circuit 2 accesses the storage unit 4 and refers to the table Tb1 (Step S103). The first drive information D1, the second drive information D2, and the third drive information D3 are extracted (Step S104). The motor rotation control circuit 2 generates the first signal S1, the second signal S2 and the third signal S3 based on the first drive information D1, the second drive information D2, and the third drive information D3, generates the clock signal Cr based on the frequency Fr, and outputs the generated signal to the motor drive circuit 3 (Step S105).

The motor rotation control circuit 2 rotates and drives the motor Mr based on the first signal S1, the second signal S2, the third signal S3, and the clock signal Cr (Step S106). The motor control device A in the present embodiment drives the motor Mr using the motor control method described above.

That is, in the motor control method of the motor control device A according to the present embodiment, the first drive information D1 indicating a drive state or a drive stop state of the motor Mr, the second drive information D2 indicating a rotation direction of the motor Mr, the third drive information D3 indicating whether the motor Mr is in a forced stop state, and the fourth drive information D4 indicating a rotational speed of the motor Mr are included in the single drive signal Sg1. Then, two or more pieces of information of the first drive information D1, the second drive information D2, the third drive information D3, and the fourth drive information D4 are included in any one of a duty ratio, a voltage, and a frequency of the drive signal Sg1, and two or more pieces of information of the first drive information D1, the second drive information D2, the third drive information D3 and the fourth drive information D4 are extracted from the drive signal Sg1 to control the motor Mr.

The above operation will be described with reference to a specific example. For example, in the motor control device A, the input terminal 1 receives a drive signal Sg1 having a duty ratio Dr of 60% from the control device Mc. In this case, the drive signal Sg1 input from the input terminal 1 is input to the motor rotation control circuit 2. The motor rotation control circuit 2 acquires a duty ratio Dr and a frequency Fr from the drive signal Sg1. Then, the motor rotation control circuit 2 accesses the storage unit 4 and refers to the table Tb1. The motor rotation control circuit 2 checks which of the first range H1 to the fourth range H4 includes 60%, which is the duty ratio Dr of the drive signal Sg1. Here, since the duty ratio Dr is 60%, the duty ratio Dr of the drive signal Sg1 is in the third range H3.

The motor rotation control circuit 2 extracts the first drive information D1, the second drive information D2, and the third drive information D3 in the third range H3 from the table Tb1. Here, the first drive information D1 is in a drive state, that is, Lo. The second drive information D2 is a CW direction (Hi). The third drive information D3 is forced stop OFF (Hi). Accordingly, the motor rotation control circuit 2 determines that the drive signal Sg1 is a command signal for setting the motor Mr in a drive state and a CW direction. Therefore, the motor rotation control circuit 2 transmits a Lo signal as the first signal S1 based on the first drive information D1, a Hi signal as the second signal S2 based on the second drive information D2, and a Hi signal as the third signal S3 based on the third drive information D3 to the motor drive circuit 3 at the same time.

In addition, the motor rotation control circuit 2 generates a clock signal Cr indicating a rotational speed of the motor Mr from the frequency Fr of the drive signal Sg1. The motor rotation control circuit 2 transmits the clock signal Cr and the first signal S1, the second signal S2, and the third signal S3 to the motor drive circuit 3 at the same time.

The motor drive circuit 3 supplies power for setting the motor Mr in a CW direction and a drive state to the motor Mr based on the first signal S1, the second signal S2, and the third signal S3. Also, power supply to the motor Mr may be performed by switching a switching element (not shown) along a power line (not shown) connected to a power source (not shown). However, a method of supplying power to the motor Mr is not limited thereto.

In the motor control device A using the motor control method according to the present embodiment, the first drive information D1, the second drive information D2, and the third drive information D3 are extracted from the duty ratio of the single drive signal Sg1 from the control device Mc that is an external device. In addition, the fourth drive information D4 is extracted from the frequency of the drive signal Sg1. Accordingly, in the single drive signal Sg1, the first drive information D1, the second drive information D2, and the third drive information D3 can be extracted from the duty ratio, and the fourth drive information D4 can be extracted from the frequency. Therefore, it is possible to select an element of an accurate input signal for each piece of drive information to be extracted.

In the motor control device A according to the present embodiment, it is possible to extract a plurality of pieces of drive information of the motor Mr from the single drive signal Sg1 from an external device. Therefore, one terminal can be set to be allocated to the drive signal Sg1 of the input terminal 1. In addition, since information items included in the drive signal Sg1 can be extracted at the same time, it is possible to minimize a delay time until all information is extracted compared to a configuration in which a single signal is divided in time series and a plurality of pieces of information are transmitted. In addition, compared to when a single signal is divided in time series, it is possible to simplify an information extraction operation, and it is possible to simplify a circuit configuration of the motor rotation control circuit 2. As a result, it is possible to reduce a load of the motor rotation control circuit 2.

In addition, in the table Tb1, a range (the second range H2) indicating a drive stop state of the first drive information D1 is included between a range (the first range H1) indicating rotation in a first direction (CCW direction) of the second drive information D2 and a range (the third range H3) indicating rotation in a second direction (CW direction) that is a direction opposite to the first direction of the second drive information D2. In this manner, in the table Tb, the second range H2 indicating a drive stop state is included between the first range H1 of a drive state of the motor Mr in the CCW direction and the third range H3 in the drive state in the CW direction. When the duty ratio Dr of the drive signal Sg1 changes, the drive state in the first direction is prevented from being immediately switched to the drive state in the second direction so that it is possible to reduce a load of the motor Mr.

In addition, in the table Tb1, a range (the third range H3) indicating rotation in the second direction (CW direction) that is a direction opposite to the first direction of the second drive information D2 is included between a range (the first range H1) indicating rotation in the first direction (CCW direction) of the second drive information D2 and a range (the fourth range H4) indicating a forced stop state of the third drive information D3. In such a configuration, it is possible to quickly and forcibly stop the motor Mr that rotates in the CW direction. Also, in the present embodiment, the second drive information D2 in the first range H1 is the CCW direction, and the second drive information D2 in the third range H3 is the CW direction, or vice versa. In this case, when the table Tb1 is used, it is possible to quickly and forcibly stop the motor Mr that rotates in the CCW direction. In addition, while the fourth range H4 is a range in which the duty ratio is the highest, the present invention is not limited thereto. For example, a portion of the first range H1 may be set as a range in which the third drive information D3 is forced stop ON.

A modification of a motor control device according to a first embodiment will be described. FIG. 6 is a diagram showing another example of the table. In a table Tb2 in FIG. 6, available values of the duty ratio are divided into five equal ranges. Therefore, in the table Tb2, a fifth range H5 has a duty ratio of less than 20%. The first range H1 has a duty ratio of 20% or more and less than 40%. The second range H2 has a duty ratio of 40% or more and less than 60%. The third range H3 has a duty ratio of 60% or more and less than 80%. The fourth range H4 has a duty ratio of 80% or more.

The table Tb2 has the same configuration as the table Tb1 except that boundaries of the duty ratio of the first range H1 to the fourth range H4 are different. Therefore, detailed description of the first range H1 to the fourth range H4 will be omitted. In the table Tb2, the first drive information D1, the second drive information D2, and the third drive information D3 associated with the fifth range H5 are the same as those of the fourth range H4. In the fifth range H5, the first drive information D1 is Hi (drive stop state), the second drive information D2 is Hi (CW direction), and the third drive information D3 is Lo (forced stop ON). The fifth range H5 is forced stop ON.

That is, in the table Tb2, a range (the first range H1) indicating rotation in the first direction (CCW direction) that is a direction opposite to the second direction of the second drive information D2 is included between a range (the third range H3) indicating rotation in the second direction (CW direction) of the second drive information D2 and a range (the fifth range H5) indicating a forced stop state of the third drive information D3. In such a configuration, even if the motor Mr is in a rotation state in the CCW direction or in a rotation state in the CW direction, it is possible to directly forcibly stop the motor Mr by changing the duty ratio. Accordingly, even if a problem occurs, it is possible to quickly stop the motor Mr.

Another modification of the motor control device according to the first embodiment will be described. FIG. 7 is a diagram showing another example of the table. In a table Tb3 in FIG. 7, a boundary range H6 is included in a portion that is adjacent to the first range H1 and the second range H2. In the table Tb3, the first range H1 has a duty ratio of less than 24% and the second range H2 has a duty ratio of 26% or more and less than 49%. Also, boundary ranges H6 are provided in a portion that is adjacent to the second range H2 and the third range H3, and a portion that is adjacent to the third range H3 and the fourth range H4. That is, in the table Tb3, the boundary ranges H6 are included in boundaries between adjacent ranges.

In the table Tb3, the boundary ranges H6 are provided in portions that are adjacent to ranges associated with the first drive information D1, the second drive information D2, and the third drive information D3. The boundary ranges H6 are dead zones that are used in hysteresis control. Therefore, when the duty ratio Dr changes and is in a boundary range H6, the motor rotation control circuit 2 extracts information associated with a range in which the duty ratio Dr before change is included.

For example, an example in which the duty ratio Dr changes between 23% and 27% will be described. When the duty ratio Dr is 23%, the motor rotation control circuit 2 determines that the duty ratio Dr is the first range H1. In this state, when the duty ratio Dr changes and is 25%, it is in the boundary range H6. Since the duty ratio Dr enters the boundary range H6 from the first range H1, the motor rotation control circuit 2 extracts drive information of the first range H1 successively from the previous range.

Then, when the duty ratio Dr exceeds 26%, the motor rotation control circuit 2 determines that the duty ratio Dr is in the second range H2. On the other hand, it is assumed that the duty ratio Dr is changed from 27% to 25%. Since the duty ratio Dr enters the boundary range H6 from the second range H2, the motor rotation control circuit 2 extracts drive information of the second range H2 successively from the previous range. Therefore, when the duty ratio Dr is less than 24%, the motor rotation control circuit 2 determines that the duty ratio Dr is in the first range H1.

When a boundary range is provided between ranges with which the first drive information D1, the second drive information D2 and third drive information are associated and the duty ratio Dr is in the boundary range, drive information in the previous range is extracted. As a result, it is possible to prevent drive information from being frequently switched even if the duty ratio Dr changes to a value in the vicinity of the boundary.

Also, while all widths (hystereses) of the boundary ranges between adjacent ranges are 2% in the present embodiment, the present invention is not limited thereto. For example, the width of the boundary range may be greater or smaller than 2%. When the width of the boundary range increases, the control is stable, but detection accuracy of switching of the state of the motor Mr decreases. In addition, when the width of the boundary range decreases, the state of the motor Mr is easily switched, but the control is likely to be unstable. Therefore, it is possible to change the width of the boundary range in response to deterioration of signal transmission and a noise imparted state in the motor control device A, the control device Mc, and wirings connecting them.

In addition, while all widths of the boundary ranges between adjacent ranges are 2%, the present invention is not limited thereto. For example, the forced stop state may be a forced stop state due to a problem. Therefore, in order to restore the state from the forced stop state, a greater hysteresis is given, that is, the width of the boundary range between the third range H3 and the fourth range H4 may be 4%.

Figure 8:
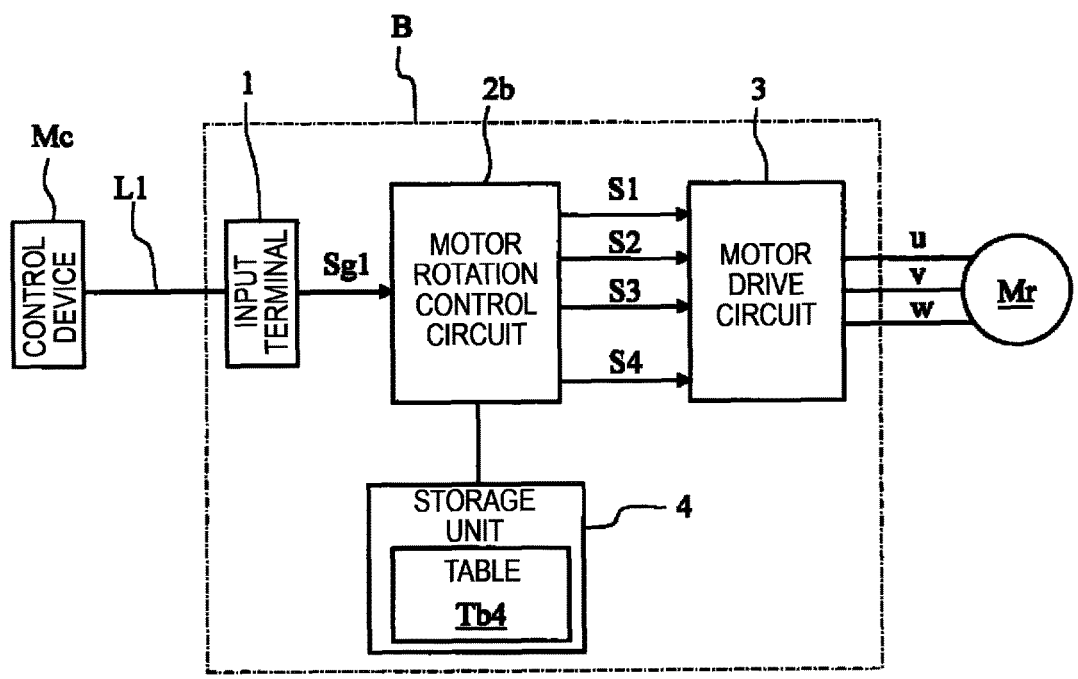
FIG. 8 is a block diagram of another example of the motor control device according to the present invention.

A motor control device according to an exemplary second embodiment of the present invention will be described with reference to the drawing. FIG. 8 is a block diagram of another example of the motor control device according to the present invention. Here, a motor control device B of the present embodiment is the same as the motor control device A of the first embodiment except that a motor rotation control circuit 2b is different and a table Tb4 is different. Accordingly, parts that are substantially the same will not be described in detail.

The motor rotation control circuit 2b of the motor control device B in the present embodiment is a circuit configured to acquire a duty ratio Dr from the drive signal Sg1. The fourth drive information D4 that is information about a rotational speed is extracted from the duty ratio Dr acquired from the drive signal Sg1 in addition to the first drive information D1, the second drive information D2, and the third drive information D3. Then, the motor rotation control circuit 2b transmits a fourth signal S4 to the motor drive circuit 3 in place of the clock signal Cr.

That is, a motor control device B extracts at least two pieces of information of the first drive information D1, the second drive information D2, the third drive information D3, and the fourth drive information D4 from the duty ratio Dr of the drive signal Sg1.

In the motor control device B, the motor rotation control circuit 2b acquires the duty ratio Dr of the drive signal Sg1, refers to the table Tb4 stored in the storage unit 4, and extracts drive information.

Figure 10:
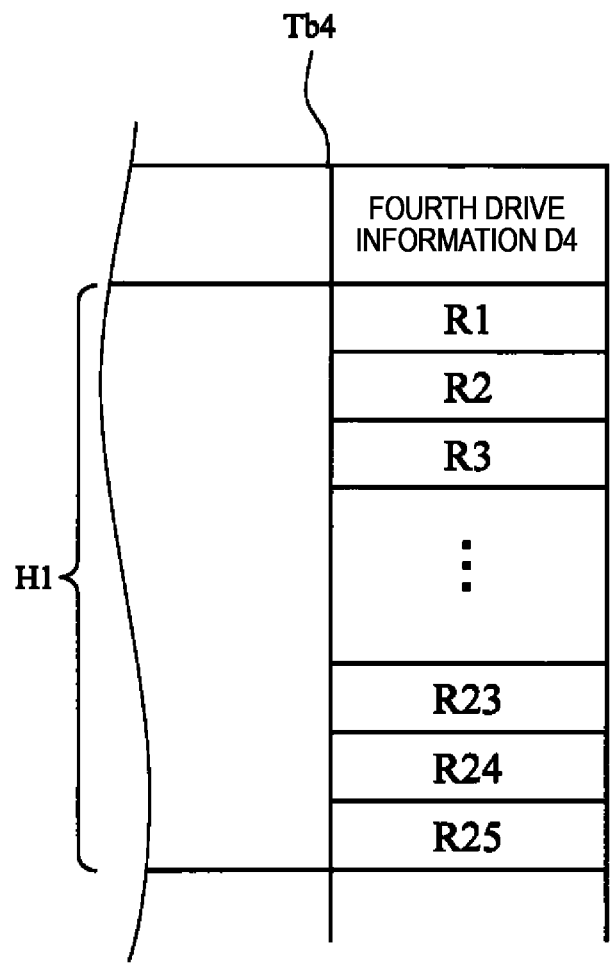
FIG. 10 is an enlarged view of fourth drive information in a first range of the table shown in FIG. 9.

Here, the table Tb4 will be described. FIG. 9 is a diagram showing an example of a table used in the motor control device shown in FIG. 8. The table Tb4 has a configuration in which the fourth drive information D4 is added to the table Tb1. In addition, FIG. 10 is an enlarged view of the fourth drive information D4 of the first range of the table shown in FIG. 9. Also, while FIG. 10 shows the fourth drive information D4 of the first range H1, the third range H3 also has the same configuration.

As shown in FIG. 9, in the table Tb4, the range of the duty ratio is divided into the first range H1, the second range H2, the third range H3, and the fourth range H4. Since these ranges, and the first drive information D1, the second drive information D2, and the third drive information D3 are the same as those in the table Tb1, details thereof will be omitted.

Here, the first range H1 of the table Tb4 is focused on. In the table Tb4, the duty ratio Dr and the fourth drive information D4 are associated. The fourth drive information D4 of the first range H1 is divided into 25 levels of 1% from 0% to 24% of the duty ratio. Different rotational speeds are associated with the divided levels. Also, here, a rotational speed associated with a level of a duty ratio of 0% is set as R1 and a rotational speed associated with a level of a duty ratio of 24% is set as R25. Here, R1<R25 is assumed. For example, a speed when the duty ratio Dr of the drive signal Sg1 is 16% is set as R16. The third range H3 is similarly divided into 25 levels, a rotational speed associated with a level of a duty ratio of 50% is set as R1, and a rotational speed associated with a duty ratio of 74% is set as R25.

For example, the motor rotation control circuit 2b acquires 15% as the duty ratio Dr of the drive signal Sg1. In this case, since the duty ratio Dr is in the first range H1, a drive state (Lo) is extracted as the first drive information D1 of the first range H1. In addition, the CCW direction (Lo) is extracted as the second drive information D2. In addition, forced stop OFF (Hi) information is extracted as the third drive information D3. In addition, the motor rotation control circuit 2b extracts a rotational speed R16 when the duty ratio Dr is 15% based on the table Tb4.

Then, the motor rotation control circuit 2b transmits Lo, Lo, and Hi signals to the motor drive circuit 3 as the first signal S1, the second signal S2, and the third signal S3. In addition, as the fourth signal S4, a signal including information of the rotational speed R16 is transmitted to the motor drive circuit 3.

As described above, in the motor control device B, information items of the first drive information D1, the second drive information D2, the third drive information D3, and the fourth drive information D4 can be extracted from the duty ratio Dr of the drive signal Sg1. Accordingly, it is possible to control a drive state and a rotational speed of the motor Mr for which PLL control is difficult. Also, when the motor Mr has the same configuration as in the first embodiment, the fourth signal S4 is set as a signal having the same configuration as the clock signal Cr and may be transmitted to the motor drive circuit 3.

Figure 11:
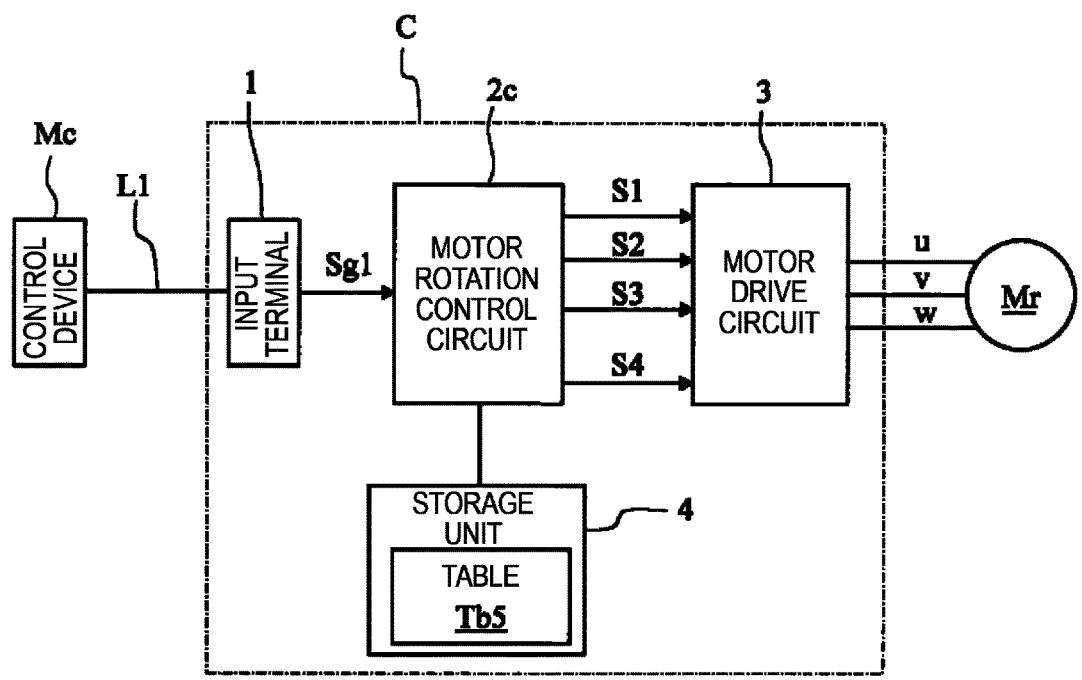
FIG. 11 is a block diagram of another example of the motor control device according to the present invention.

A modification of the motor control device according to the second embodiment will be described. FIG. 11 is a block diagram of another example of the motor control device according to the present invention. Here, a motor control device C of the present embodiment is the same as the motor control device B of the second embodiment except that a motor rotation control circuit 2c is different and a table Tb5 is different. Accordingly, parts that are substantially the same will not be described in detail.

The motor rotation control circuit 2c of the motor control device C in the present embodiment is a circuit configured to acquire a voltage Vr from the drive signal Sg1. The fourth drive information D4 that is information about a rotational speed is extracted from the voltage Vr acquired from the drive signal Sg1 in addition to the first drive information D1, the second drive information D2, and the third drive information D3. Here, since a circuit configured to acquire a voltage of an input signal has already been described, details thereof will be omitted.

The motor control device C extracts at least two pieces of information of the first drive information D1, the second drive information D2, the third drive information D3, and the fourth drive information D4 from the voltage Vr of the drive signal Sg1.

In the motor control device C, the motor rotation control circuit 2c acquires the voltage Vr of the drive signal Sg1, refers to the table Tb5 stored in the storage unit 4, and extracts drive information.

Here, the table Tb5 will be described. FIG. 12 is a diagram showing an example of a table used in the motor control device shown in FIG. 11. In the table Tb5, the range of the available voltage, for example, Vr1 to Vr5, of the drive signal Sg1 is divided into four equal ranges. The divided voltage ranges are set as a first range I1 to a fourth range I4. The first range I1 is a range in which the voltage is Vr1 or higher and lower than Vr2. The second range I2 is a range in which the voltage is Vr2 or higher and lower than Vr3. The third range I3 is a range in which the voltage is Vr3 or higher and lower than Vr4. The fourth range I4 is a range in which the voltage is Vr4 or higher and Vr5 or less.

Also, the first drive information D1, the second drive information D2, the third drive information D3, and the fourth drive information D4 in the first range I1 to the fourth range I4 in the table Tb5 are substantially the same as the first drive information D1, the second drive information D2, the third drive information D3, and the fourth drive information D4 in the first range H1 to the fourth range H4 of the table Tb4. Accordingly, details thereof will not be described. Also, depending on the range of the available voltage of the drive signal Sg1, it may be difficult for the first range I1 and the third range I3 to be divided into 25 levels. In this case, the first range I1 and the third range I3 are divided into 25 or fewer levels, for example, 10 levels, and a speed may be associated with each level.

In such a configuration, a signal whose duty ratio is not easily detected can be used as a drive signal for driving the motor Mr using a signal having a different voltage. Here, the voltage is, for example, a peak voltage. However, a physical quantity defined as the voltage is not limited thereto. For example, an integral value of a voltage value may be used and an average value may be used.

Figure 13:
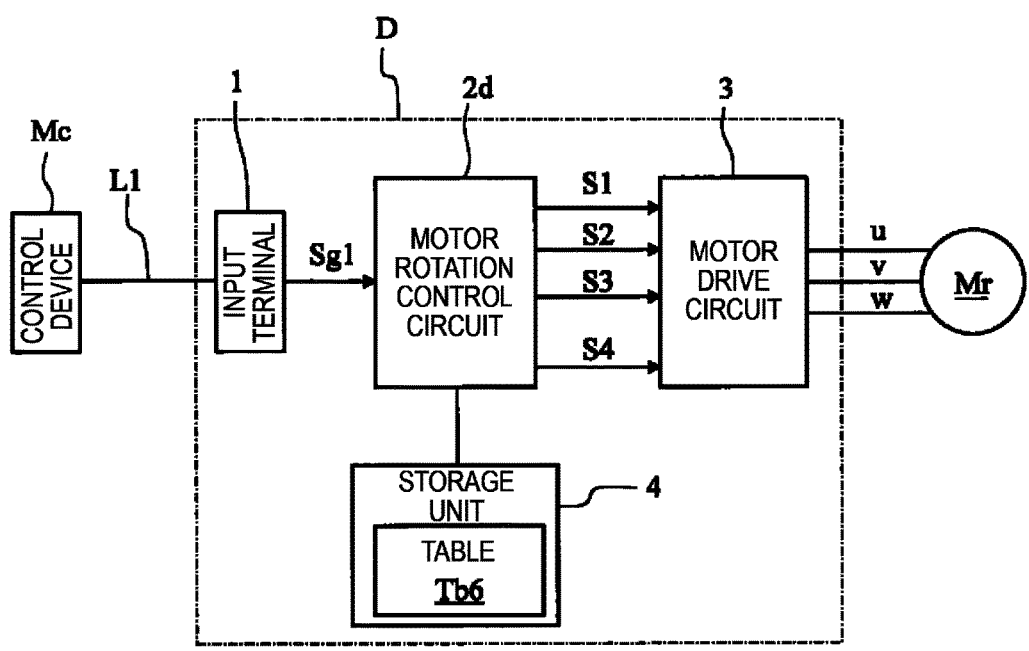
FIG. 13 is a block diagram of another example of the motor control device according to the present invention.

Another modification of the motor control device according to the second embodiment will be described. FIG. 13 is a block diagram of another example of the motor control device according to the present invention. Here, a motor control device D of the present embodiment is the same as the motor control device B of the second embodiment except that a motor rotation control circuit 2d is different and a table Tb6 is different. Accordingly, parts that are substantially the same will not be described in detail.

The motor rotation control circuit 2d of the motor control device D shown in the present embodiment is a circuit configured to acquire a frequency Fr from the drive signal Sg1. The fourth drive information D4 that is information about a rotational speed is extracted from the frequency Fr acquired from the drive signal Sg1 in addition to the first drive information D1, the second drive information D2, and the third drive information D3. Here, since a circuit configured to acquire a frequency of an input signal has already been described, details thereof will be omitted.

The motor control device D extracts at least two pieces of information of the first drive information D1, the second drive information D2, the third drive information D3, and the fourth drive information D4 from the frequency Fr of the drive signal Sg1.

In the motor control device D, the motor rotation control circuit 2d acquires the frequency Fr of the drive signal Sg1, refers to the table Tb6 stored in the storage unit 4, and extracts drive information.

Here, the table Tb6 will be described. FIG. 14 is a diagram showing an example of a table used in the motor control device shown in FIG. 13. In the table Tb6, the range of the available frequency, for example, Fr1 to Fr5, of the drive signal Sg1 is divided into four equal ranges. The divided frequency ranges are set as a first range J1 to a fourth range J4. The first range J1 is a range in which the frequency is Fr1 or higher and lower than Fr2. The second range J2 is a range in which the frequency is Fr2 or higher and lower than Fr3. The third range J3 is a range in which the frequency is Fr3 or higher and lower than Fr4. The fourth range J4 is a range in which the frequency is Fr4 or higher and Fr5 or lower.

Also, the first drive information D1, the second drive information D2, the third drive information D3 and the fourth drive information D4 in the first range J1 to the fourth range J4 in the table Tb6 are substantially the same as the first drive information D1, the second drive information D2, the third drive information D3, and the fourth drive information D4 in the first range H1 to the fourth range H4 in the table Tb4. Accordingly, details thereof will not be described. Also, depending on the range of the available frequency of the drive signal Sg1, it may be difficult for the first range J1 and the third range J3 to be divided into 25 levels. In this case, the first range J1 and the third range J3 are divided into 25 or fewer levels, for example, 10 levels, and a speed may be associated with each level.

In such a configuration, a signal whose duty ratio is not easily detected can be used as a drive signal for driving the motor Mr using a drive signal having a different frequency.

In addition, the first drive information D1, the second drive information D2, the third drive information D3, and the fourth drive information D4 may be extracted using a duty ratio and a voltage of the drive signal Sg1. In addition, the first drive information D1, the second drive information D2, the third drive information D3, and the fourth drive information D4 may be extracted using a voltage and a frequency of the drive signal Sg1.

The motor control device according to one exemplary embodiment of the present invention can extract two or more pieces of information of the first drive information D1 indicating a drive state or drive stop state of the motor, the second drive information D2 indicating a rotation direction of the motor, the third drive information D3 indicating whether the motor is in a forced stop state, and the fourth drive information D4 indicating a rotational speed of the motor from at least one of the duty ratio Dr, the voltage Vr, and the frequency Fr in the single drive signal Sg1 input from the input terminal 1, and control the motor Mr.

Here, as the drive state of the motor Mr, the first drive information D1 indicating a drive state or a drive stop state of the motor, the second drive information D2 indicating a rotation direction of the motor, the third drive information D3 indicating whether the motor is in a forced stop state, and the fourth drive information D4 indicating a rotational speed of the motor may be exemplified, but the present invention is not limited thereto. In addition, information used when the motor Mr drives, for example, a feedback gain and information indicating whether soft start is performed can be widely used. In this case, it is possible to respond to such a case by increasing the number of divisions in a table. In addition, each piece of drive information may be extracted using a plurality of tables.

The tables in the above embodiments and modifications are tables in which values acquired from the drive signal Sg1, that is, the duty ratio Dr, the voltage Vr, and the frequency Fr, are associated with drive information items, but the present invention is not limited thereto. For example, the table may have a form of graph showing relationships between values acquired from the drive signal Sg1 and drive information items. In addition, drive information may be extracted according to calculation using an arithmetic expression showing relationships between values acquired from the drive signal Sg1 and drive information items. That is, while the motor control device has a configuration in which the motor rotation control circuit refers to the table, the present invention is not limited thereto. A configuration or a method in which the motor rotation control circuit can uniquely extract drive information items from values acquired from the drive signal Sg1 can be widely used.

While the above embodiments have a configuration in which the motor rotation control circuit 2 and the motor drive circuit 3 are separate circuits and mounted on the board Bd, the present invention is not limited thereto. For example, the motor rotation control circuit 2 and the motor drive circuit 3 may be integrated into one package, that is, one chip. In this manner, it is possible to remove a signal line due to integration into one chip. In addition, at least one of the motor rotation control circuit 2 and the motor drive circuit 3 may be a program that operates in an arithmetic processing circuit. In this case, the program may be stored in the storage unit 4.

The motor control device according to the exemplary embodiment of the present invention extracts two or more pieces of information of first drive information indicating a drive state or a drive stop state of the motor, second drive information indicating a rotation direction of the motor, third drive information indicating a forced stop state of the motor, and fourth drive information indicating a rotational speed of the motor from a single drive signal from an external device (here, the control device Mc). Therefore, it is possible to reduce the number of input terminals, and it is possible to reduce the size of the motor control device. In addition, since it is possible to reduce the number of constituent members of the motor control device, it is possible to reduce cost.

While exemplary embodiments of the present invention have been described above, various modifications of the embodiments can be made within the spirit and scope of the present invention.

The present invention can be used as a motor control device configured to drive a motor that is arranged inside an OA instrument such as a printer and a multifunction machine. The present invention can also be used in various electronic devices in addition to the printer and the multifunction machine.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor control device configured to control rotation of a motor based on a single drive signal input from an input terminal, wherein
   the motor control device stores a table in which at least one of a duty ratio, a voltage, and a frequency in the single drive signal is divided into a plurality of ranges;
   the motor control device extracts two or more pieces of information including first drive information indicating a drive state or a drive stop state of the motor, second drive information indicating a rotation direction of the motor, third drive information indicating whether the motor is in a forced stop state, and fourth drive information indicating a rotational speed of the motor from the at least one of the duty ratio, the voltage, and the frequency in the single drive signal, and controls the motor according to the extracted two or more pieces of information;
   in the table, a boundary range which has no drive signal is included in a boundary between adjacent ranges associated with the first drive information, the second drive information, and the third drive information; and
   when the at least one of the duty ratio, the voltage, and the frequency in the single drive signal changes and is in the boundary range, information associated with a range including the at least one of the duty ratio, the voltage, and the frequency in the single drive signal before changing is extracted.
2. The motor control device according to claim 1, wherein at least two pieces of information of the first drive information, the second drive information, the third drive information, and the fourth drive information are extracted from the duty ratio of drive signal.

3. The motor control device according to claim 1, wherein at least two pieces of information of the first drive information, the second drive information, the third drive information, and the fourth drive information are extracted from the voltage of the drive signal.

4. The motor control device according to claim 1, wherein at least two pieces of information of the first drive information, the second drive information, the third drive information, and the fourth drive information are extracted from the frequency of the drive signal.

5. The motor control device according to claim 1, wherein the first drive information, the second drive information, and the third drive information are extracted from the duty ratio of the drive signal, and wherein the fourth drive information is extracted from the frequency of the drive signal.

6. The motor control device according to claim 5, wherein the motor control device refers to the table and extracts the first drive information, the second drive information, and the third drive information.

7. The motor control device according to claim 6, wherein, in the table, a range indicating a drive stop state of the first drive information is included between a range indicating rotation in a first direction of the second drive information and a range indicating rotation in a second direction that is a direction opposite to the first direction of the second drive information.

8. The motor control device according to claim 6, wherein, in the table, a range indicating rotation in a second direction that is a direction opposite to a first direction of the second drive information is included between a range indicating rotation in the first direction of the second drive information and a range indicating a forced stop state of the third drive information.

9. The motor control device according to claim 8, wherein, in the table, a range indicating rotation in the first direction that is a direction opposite to the second direction of the second drive information is included between a range indicating rotation in the second direction of the second drive information and a range indicating a forced stop state of the third drive information.

10. A motor control method through which drive of a motor is controlled based on a drive signal, comprising:

storing a table in which at least one of a duty ratio, a voltage, and a frequency in the single drive signal is divided into a plurality of ranges; wherein first drive information indicating a drive state or a drive stop state of the motor, second drive information indicating a rotation direction of the motor, third drive information indicating whether the motor is in a forced stop state, and fourth drive information indicating a rotational speed of the motor are included in the single drive signal, two or more pieces of information of the first drive information, the second drive information, the third drive information, and the fourth drive information are included in the at least one of the duty ratio, the voltage, and the frequency of the drive signal, and two or more pieces of information of the first drive information, the second drive information, the third drive information, and the fourth drive information are extracted from the drive signal to control the motor according to the extracted two or more pieces of information;

in the table, a boundary range which has no drive signal is included in a boundary between adjacent ranges associated with the first drive information, the second drive information, and the third drive information; and when the at least one of the duty ratio, the voltage, and the frequency in the single drive signal changes and is in the boundary range, information associated with a range including the at least one of the duty ratio, the voltage, and the frequency in the single drive signal before changing is extracted.

11. The motor control method according to claim 10, wherein the first drive information, the second drive information, and the third drive information are extracted from the duty ratio of the drive signal, and the fourth drive information is extracted from the frequency of the drive signal.

12. The motor control method according to claim 11, wherein an additional table in which the duty ratio is divided into a plurality of ranges and the first drive information, the second drive information, and the third drive information are associated with the ranges is used in controlling the motor, and the first drive information, the second drive information, and the third drive information are extracted.

* * * * *